(12) United States Patent
Mirsberger et al.

(10) Patent No.: US 6,874,741 B2
(45) Date of Patent: Apr. 5, 2005

(54) HOLDING DEVICE FOR SECURING A SHOE ELEMENT OF A PIPELINE SECTION

(75) Inventors: Helmut Mirsberger, Munich (DE); Ulrich Birnbaun, Penzing (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/638,229

(22) Filed: Aug. 7, 2003

(65) Prior Publication Data

US 2004/0094675 A1 May 20, 2004

(30) Foreign Application Priority Data

Aug. 8, 2002 (DE) .......................................... 102 36 550

(51) Int. Cl.$^7$ .............................................. A47B 96/06
(52) U.S. Cl. ................................ 248/228.3; 248/228.1
(58) Field of Search ......................... 248/228.2, 228.3, 248/229.12, 229.2, 229.21, 65, 72, 73, 74.1, 74.2, 74.4, 500

(56) References Cited

U.S. PATENT DOCUMENTS

| | | | | |
|---|---|---|---|---|
| 1,473,504 A | * | 11/1923 | Neely | ............................ 191/40 |
| 1,831,798 A | * | 11/1931 | Alsaker | .................... 248/228.3 |
| 2,529,153 A | * | 11/1950 | Hain | ........................ 238/14.14 |
| 3,029,055 A | * | 4/1962 | Smith | ........................ 248/228.3 |
| 3,124,330 A | * | 3/1964 | Robinson | .................. 248/228.2 |
| 4,611,776 A | * | 9/1986 | Williams | .................. 248/228.3 |
| 4,826,113 A | * | 5/1989 | Winters | ........................ 248/72 |

FOREIGN PATENT DOCUMENTS

| | | |
|---|---|---|
| DE | 9811482 | 10/1998 |
| DE | 9922212 | 3/2000 |
| EP | 0456851 | 8/1993 |
| EP | 1043532 | 10/2000 |

* cited by examiner

Primary Examiner—Leslie A. Braun
Assistant Examiner—Tan Le
(74) Attorney, Agent, or Firm—Sidely Austin Brown & Wood, LLP

(57) ABSTRACT

A holding device for securing a shoe element of a pipeline section includes at least two claw members (11.1, 11.2; 61) each having a claw section (31) for engaging around a support edge (127.1, 127.2), a bearing section (32) adjoining the claw section (31) for supporting the claw member (11.1, 11.2; 61) on an outer side of the support (3), and a flange section (21; 62; 118.1, 118.2); and includes a plurality of holding-down members (12.1, 12.2; 51; 71; 81; 91; 101; 119.1, 119.2), with at least one of the holding-down members being secured on each of the at least two claw members and being formed as a separate part securable on the flange section (21; 62; 118.1, 118.2) of the claw member with a fastening element.

11 Claims, 7 Drawing Sheets

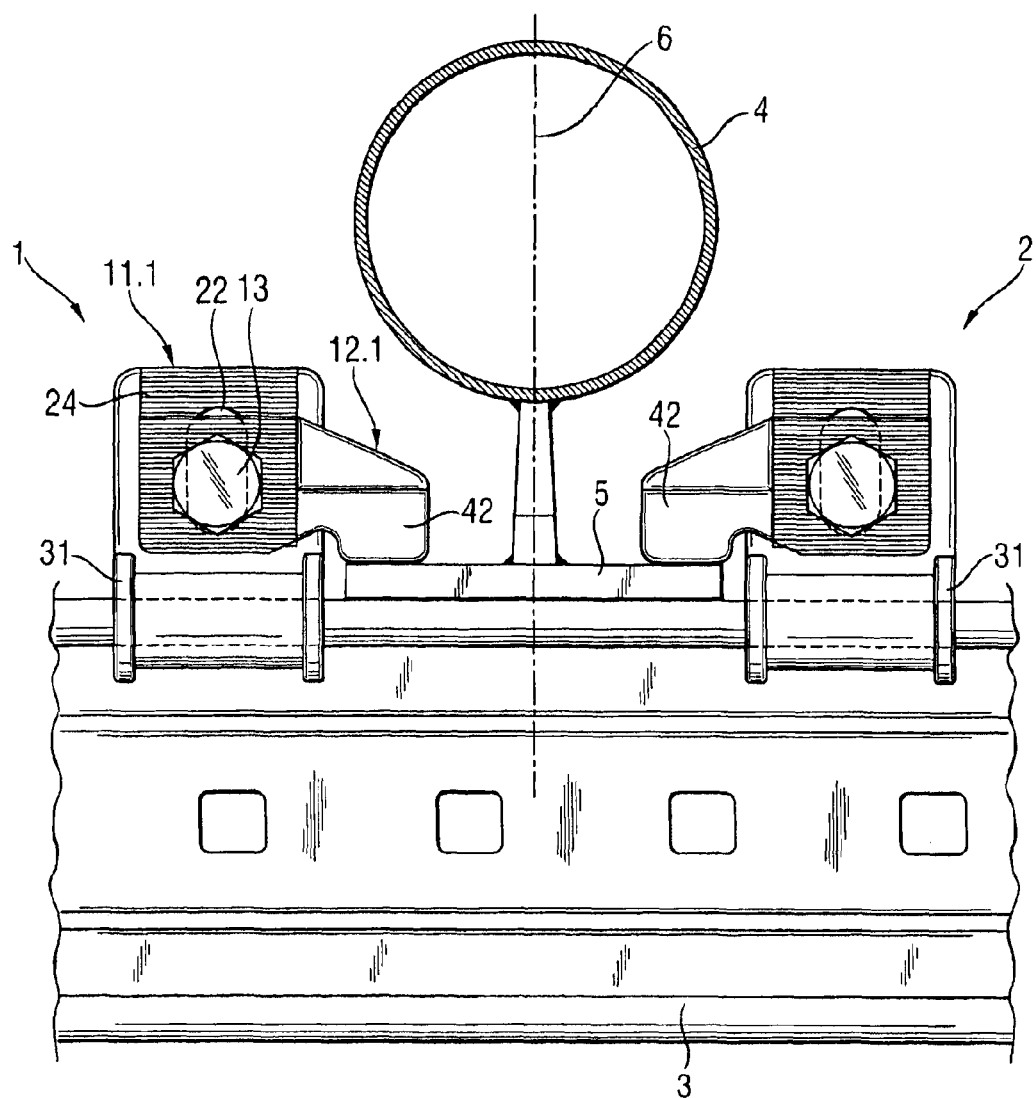

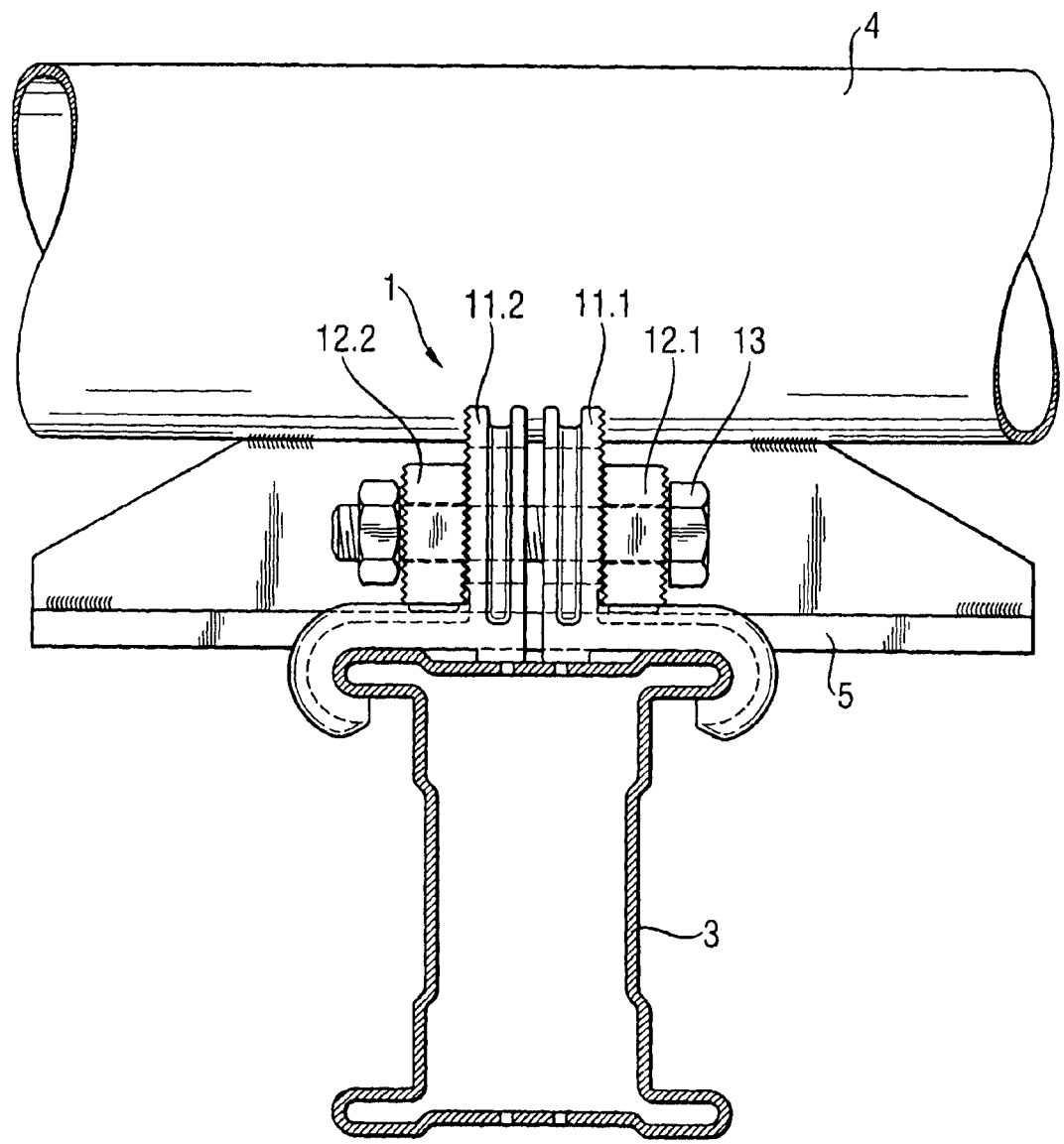

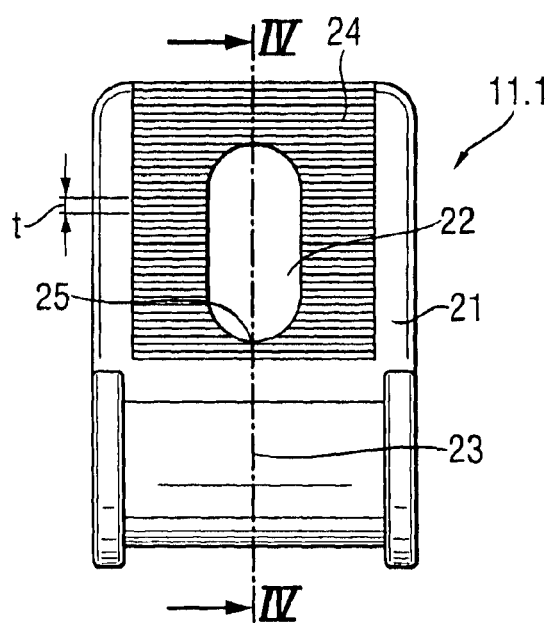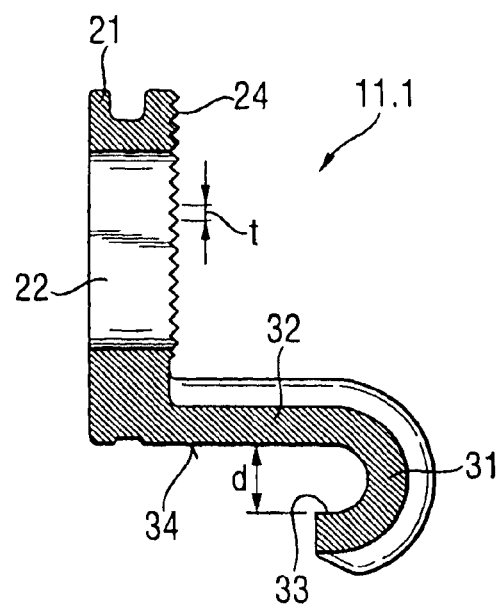

HOLDING DEVICE FOR SECURING A SHOE ELEMENT OF A PIPELINE SECTION

BACKGROUND OF THE INVENTION

1. Field of the Invention

The present invention relates to a holding device for securing a shoe element of a pipeline section and having a bearing plate on a support, in particular, on a system support of an assembly system and including at least two claw members each having a claw section for engaging around an edge of the support a bearing section adjoining the claw section for supporting the claw member on an outerside of the support, and a flange section extending substantially perpendicular to the bearing section and having an opening for securing the claw member on the support with a fastening element and a plurality of holding-down members for holding-down the bearing plate on the outer surface of the support.

2. Description of the Prior Art

In the industry, pipeline sections, e.g., tubular conduits are supported on frameworks made of steel. The frameworks are formed as profile supports or system supports of an assembly system. For holding the tubular conduits on the frameworks, so-called pipe holders are used. A pipe holder includes a pipe clamp for enveloping tubular conduit and a bearing plate that often is called a pipe shoe. The pipe holder is secured on a, primarily horizontal, support of a framework to as to prevent movement of the pipe shoe perpendicular to the support and transverse to the axis of the tubular conduit.

The bearing plate is held, e.g., with a Z- or L-shaped weldbrackets which are welded directly to a profile support. Also, as holding means, claw members are used which are supported on an edge of a support flange and hold the bearing plate on the profile support with a nose-shaped projection.

German Patent DE 19653538C1 discloses pipe attachment means including a bearing plate with a web extending perpendicular to the bearing plate that has the same thickness. The bearing plate is secured on the support. by claw members specifically adapted to the bearing plate. The tubular conduit is surrounded by a pipe clamp arranged on a holding plate connectable with the web. For adjusting the height of the tubular conduit, the web and the holding plate can be displaced relative to each other and be secured with each other. To provide for form- and forcelocking connection, a holding profile is provided on both parts, with the two parts being secured with a bolt.

A drawback of all of the known solutions consists in that welding should be performed only by specialized workers, which noticeably increases the manufacturing costs, and in that the other costs associated with these types of attachment are also very high. E.g., before welding, the surface protection layer of the support in the region of the attachment should be removed, then, the welded region should be protected from corrosion. In explosion dangerous regions, the welding should be performed only by an expensive licensed process and with undertaking of additional temporary constructional measures. Adaptation or changing of the pipeline section attachment when the necessary connections are obtained by welding, can be effected only with substantial costs.

The drawback of conventional claw members of the type discussed above consists in that, e.g., for different pipe diameters, and/or bearing plates, and different profile cross-sections, a large number of costs-intensive parts is needed. The use of claw members according to the German Patent DE 196535358C1 with conventional pipe shoes is not possible. Because the pipe shoe should be able to at least partly slide on the support, dependent on the type of the support, there are provided slide pads formed, e.g., of stainless steel or a plastic material and which influence the thickness of a to-be-secured pipe shoe. Further, different operators demand different clearances between the upper edge of the bearing plate and the holding-down member. These requirements lead to a further differentiation of the claw members.

For the lefthand side or the righthand side, with respect to the conduit axis, mounting of the holding device, two different construction of the claw members are required or should be available. In addition, an expensive planning is required as the claw members need to be selected in accordance with an effective mass of the construction.

Accordingly, an object of the invention is to provide a holding device for securing shoe elements of pipeline sections on a support and which can be used for a number of different construction of shoe elements.

Another object of the present invention is to provide a holding device that can be easily produced and mounted.

SUMMARY OF THE INVENTION

These and other objects of the present invention, which will become apparent hereinafter, are achieved by providing a holding device of the type described in the preamble and in which at least one of the holding-down members if formed as a separate part mountable on a claw member and securable on the flange section of the claw member with the fastening element that provides for securing of the holding device on the support.

The claw members are advantageously formed as standard elements for different profile supports. The length of the flange section of the claw member is so selected that in combination with the holding-down member mounted on the flange section, conventional thicknesses of the bearing plates for supporting pipeline sections on profile supports can be retained. Two claw members, which are arrangeable on the flange edges of the support and aligned with each other, are connected with a threaded rod that extends through the openings formed in the flange sections and is provided with a nut at each of its end. The claw members are secured on the support by tightening the nuts. The length of the threaded rod defines the maximal width of the support on which the holding device is to be arranged.

The at least one holding-down member can be formed, e.g., as a U-shaped member and be pinned on the flange section. In at least one leg of the U-shaped holding down-member, e.g., a tightening bolt is provided with which the holding-down member can be secured to the flange section of the claw member. Instead of using a tightening bolt, at least one section of the holding-down member can be formed as a clip-shaped section which would hold the holding-down member on the flange section when the holding-down member is pinned thereon. Preferably, with this embodiment of the holding-down member, engagement means, which engages in at least one depression on the flange section of the claw member, is provided on at least one leg. If the engagement means is formed as a projection, it can engage in a complementary, thereto, groove formed in the flange section.

In order to be able to secure with the same holding-down member bearing plates having different thicknesses on a support with different clearances, the holding-down section of the holding-down member is formed as a height-adjustable section. E.g., the holding-down section can have a section extending away from the flange section of the claw member and in which an adjusting screw, which is displaceable substantially perpendicular to the bearing plate, is arranged. With the holding-down member being secured on the flange section, the bearing plate can be secured with the adjusting screw. It is advantageous, e.g., when the holding-down member, which is secured on the lefthand side with respect to the pipe axis, is offset with respect to the holding-down member arranged on the righthand side.

For securing the bearing plate against being lifted off of the support, a holding device with two claw members and two holding-down members is used. With high loads acting on the holding-down members, to prevent the bearing plate from being lifted off, more than one holding down member is provided per side of the bearing plate. When two tubular conduits, which extent parallel to each other, need to be secured to the support, two claw members with four holding-down members can be provided between the bearing plates of these tubular conduits, with two respective holding members securing each of the two bearing plates.

Advantageously, the holding-down member includes guide means for guiding the holding-down member on the flange section of the claw member. With the guiding means, the holding-down member is aligned with respect to the flange section when it is being secured thereon. This simplifies mounting of the holding device, and the mounting can be effected much more rapidly, while a reliable connection is insured. E.g., the flange section of the claw member can be provided with at least one projection that would engage in a corresponding recess formed in the holding-down member. The projection can be formed, e.g., as a strip extending in the longitudinal direction of the flange section and engaging in an elongate groove formed in the holding-down member.

Advantageously, the flange section of the claw member includes locking means which is engageable with complementary locking means provided on the holding-down member in the mounted condition of the holding-down member. The locking means and the complementary locking means in combination with the fastening element provide for form- and forcelocking connection of the two parts, which prevents the connection from failure, providing a high reliability of the connection. The complementary locking means of the holding-down member, being engaged with the locking means of the flange section, prevents an inadvertent displacement of the holding-down member from a predetermined position, e.g., when forces are applied to the holding-down member as a result of lifting of the pipeline section off the support.

On the other hand, the holding-down member can be positioned on the flange section of the claw member dependent on the thickness of the bearing plate. With the U-shaped holding-down member, which was described previously, it is pinned on the flange section only over a portion thereof necessary for securing the bearing plate. The reliable connection of the holding-down member with the flange section is insured by mutual engagement of the locking means of the flange section of the claw member with the complementary locking means provided on the holding-down member. For lefthand-side and righthand-side mounting of the U-shaped holding-down member, the complementary locking means is provided on both surfaces of the legs adjacent to the flange sections. The complementary locking means engages, respectively, locking means provided on two sides of the flange section. This arrangement is particularly advantageous when a clip-like connection is used for connecting the holding-down member with the claw member.

Advantageously, the locking means and/or the complementary locking means are formed both as toothing, with a tooth pitch amounting, preferably, to 2 mm. With such a pitch, separate gridsteps of 2 mm and/or of multiple thereof are possible. This formation of the locking and complementary locking means covers a larger part of conventional designs of shoe elements for pipeline sections.

The toothing is selected, advantageously, in accordance with a desired adjustment to be provided by the grid and a contemplated load which would act on the connection. Specifically, the number of engaging each other teeth of the toothings of the locking and complementary locking means, the geometry, the width, and the depth of the toothing is determined. E.g., if a fine gradation of the grid formed of the locking and complementary locking means is desired, the tooth pitch of the toothings can be small. At large loads, the tooth pitch of the toothings can be made larger, with a greater depth of the teeth. As toothing, primarily, pyramidal toothing is used. The locking and the complementary locking means can be made in form of depressions, e.g., grooves.

Advantageously, the holding down member has an opening for securing the holding-down member with the fastening element on the flange section of the claw member. At least one fastening element, preferably, a threaded bolt is used for securing at least two claw members on the support and at least one holding-down member on the flange of each of the at least two claw members. With this arrangement, the number of separate components of the inventive holding device is reduced, and its mounting is significantly simplified.

The holding-down member can pivot about the axis of the fastening element, which permits to secure different bearing plates having different thicknesses on a support with the same holding-down member. According to a further embodiment of a holding-down member, the holding-down member is provided with a circular connection section on the surface of which abutting the flange section, there is provided a locking means that extends in form of rays extending from the center of the opening for the fastening element radially outwardly. The locking means provided on the flange section of the claw member are formed in the same manner. When such locking means and complementary locking means engage each other, forming a formlocking connection, an inadvertent rotation of the holding-down member under action of forces, which are caused by movement of the bearing plate, is prevented.

Advantageously, the flange section of the claw member has an elongate opening extending perpendicular to the bearing plate. Due to the elongate opening, the holding-down member can be displaced therealong to be positioned with respect to a bearing plate that is secured on the support.

Advantageously, the locking means is provided in the flange region surrounding the elongate opening, with teeth extending parallel to each other and transverse to the longitudinal extent of the elongate opening. The distance between the teeth or other elements forming the locking means, determines possible adjustment steps of the holding-down member. When a force acting transverse to the bearing plate is applied to the holding-down member, the locking means, which is aligned transverse to the longitudinal extent of the elongate opening, insure a high reliability of the connection, preventing the holding-down member from displacement under the action of the forces acting thereon.

Advantageously, the holding-down member has additional locking means provided on its side opposite the side on which the complementary locking means is provided. This, on one hand, provides for formlocking connection of the holding-down member on both sides. On the other hand, this permits to use the holding-down member for both lefthand-side and righthand-side, with respect to the pipeline section axis, connection.

Advantageously, the fastening element for securing the holding device on a support has threaded means with an engaging part having complementary locking means which can, optionally, be formed as a toothing. The engaging part can be formed, e.g., as a separate metal plate having locking means complementary to the additional locking means provided on the holding-down member. The engaging part can further be formed as a pad or a bolt head, with the locking means being formed thereon. Advantageously, the engaging part is secured on the threaded rod without a possibility of rotation relative thereto or is non-releasably connected therewith.

Due to the engagement of the additional locking means of the holding-down member with the complementary locking means of the engaging part, the threaded means is prevented from rotation, after having been tightened. For guiding the threaded rod upon its insertion in the respective openings of the holding-down members, it can be provided with guide surfaces, which insure a predetermined displacement of the threaded rod. When, e.g., the openings in the holding-down members are formed as square openings, the guide surfaces of the threaded rod are formed as flat surfaces adapted to the square openings of the holding-down members. The width of the elongate openings provided on the flange sections of the claw member correspond to the inner size of the square opening, so that the guide surfaces can be guided along the side edges of the elongate openings.

Advantageously, the fastening element is spring-biased in order to preload the connectable parts of the holding device. On one or both ends of the threaded rod, a bolt head can be provided. Generally, at least one spring is provided, preferably, between a nut and a side of a holding-down member securable with the threaded rod. The spring can be formed as a spiral spring, a leaf spring, a conical spring and the like. When the claw members and the holding-down members are connected with one fastening element, preferably, a spring is provided at each of its opposite ends. Generally, separate parts of the holding device are pre-assembled, without a possibility of being lost, and are shipped to the consumer for further use. For mounting of the holding device, the claw members are pulled, against a biasing force, in opposite directions, and are releasably held on the support in a desired position. By applying pressure or/and tensile force to the threaded rode, the holding-down members can be spaced from the flange surfaces of respective claw members and positioned therealong in a desired position, without the holding-down members loosing the necessary guidance. As soon as the positioning of separate parts is finished, by tensioning the fastening element with bolt heads and/or nuts, the holding device is secured on the support for holding the bearing plate of the shoe element on the support.

The components of the holding device can be sent loosely to a consumer. In this case, the claw members are roughly positioned on the support, and the fastening element is inserted through the openings formed in the claw members and the holding-down members. Then, at least at one end of the fastening element, a spring is mounted before a tightening nut is screwed on this end. Before the holding device is finally secured, by applying pressure to the nut, the engaging part can be lifted off the holding-down member, whereby the complementary locking means thereon disengaged from the locking means on the respective holding-down member. With a one-hand movement, the holding-down member can be repositioned. Upon release of the nut, the complementary locking means on the engaging part again engages the locking means on the holding-down member, and the holding-down member is secured on the flange section of the respective claw member.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 1 a longitudinal view of a support for a holding device according to a first embodiment of the present invention;

FIG. 2 a cross-sectional view of the support shown in FIG. 1 with the holding device according to the first embodiment of present invention;

FIG. 3 a front view of a claw member of the holding device according to the first embodiment of the present invention;

FIG. 4 a cross sectional view of the claw member along line IV—IV in FIG. 3;

DETAILED DESCRIPTION OF THE PREFERRED EMBODIMENT

Figure 5:
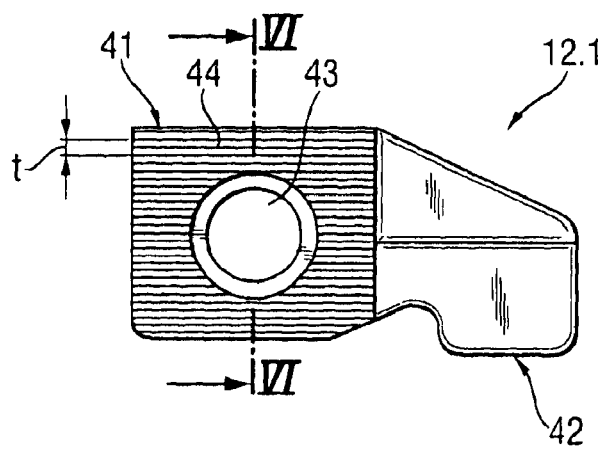
FIG. 5 a side view of a holding-down member of the holding device according to the first embodiment of the present invention.

FIGS. 1–6 show, as discussed above, a first embodiment of a holding device according to the present invention. FIG. 1 shows a longitudinal view of a support 3 on which two holding devices 1 and 2 according to the present invention are supported for holding a tubular conduit 4 a bearing plate 5 of which is supported on the support 3. The support 3 is formed as a system support for an assembly system. It should be pointed out that the holding devices 1 and 2 can be arranged on a standard profile.

The holding devices 1 and 2 are identically formed and are so arranged on the support 3 that they form a mirror-inverted image. Below, only the lefthand holding device will be described in detail. However the following description is equally applicable to the holding device 2.

FIG. 2 shows a cross-sectional view with the holding device 1 supported thereon. The holding device 1 has two claw members 11.1 and 11.2 and two holding-down members 12.1 and 12.2. Both claw members 11.1 and 11.2 and both holding down members 12.1 and 12.2 are secured with a common fastening bolt 13 on the bearing surface of the support 3.

A claw member of a holding device according to the present invention is shown in FIGS. 3–4 which show one of the claw members 11.1, 11.2, namely, the claw member 11.1 of the holding device 1. The claw member 11.1 has a flange section 21 in which an elongate opening 22, which extends in the longitudinal direction of the claw member 11.1, is formed. The holding-down member can be displaced therein vertically along an axis 23. The length of the elongate opening 22 is determined by a sum of length of a necessary, e.g., desired adjustment path of the holding-down member and of the diameter of a bolt extendable therethrough. The width of the elongate opening 22 depends on the bolt diameter. For the embodiment shown in FIGS. 1–6, a M12 bolt is used. The elongate opening 22 has dimensions 13 mm×28 mm, which provides for an adjustment path of 16 mm along which the holding-down member 12.1 can be height-adjusted. In the assembled condition of the claw member 11.1, and end 25 of the elongate opening 22 adjacent to the support 3, determines the lowest position of the holding-down member 12.1 which is arranged on the claw member 11.1. Dependent on the geometrical shape and the selected dimensions of the holding-down member 12.1 and on a desired clearance, a minimal thickness of the bearing plate, which is to be held on the support with the holding device, is determined.

The flange region, which surrounds the elongate opening 22, forms locking means 24 which is engaged by complementary locking means of the holding device 12.1. The locking means 24 and the complementary locking means can be formed, e.g., as pyramidal toothings with tooth pitch t of 2 mm in the embodiment shown in the drawings. The combination of the elongate opening 22 of the claw member 11.1 and of engageable locking and complementary locking means provides for displacement of the holding-down member 12.1 along the flange section 21 stepwise in a grid of, e.g., 4 mm. Such a formation covers the grid size which is usually required in practice.

FIG. 4 shows a cross-sectional view of the claw member 11.1. The claw member 11.1 has a claw section 31 which surrounds the flange edge of the support. The claw section 31 has a hook-shaped profile and has, in the embodiment shown in FIGS. 3–4, a semi-circular cross-section. A bearing section 32 adjoins the claw section 31. The bearing section 32 of the claw member 11.1 lies on the bearing surface of the support on which the holding device 1 is supported. The distance d between the inner edge 33 of the free end of the claw section 31 and the bearing surface 34 of the bearing section 32 determines the maximum thickness of the support flange on which the claw member 11.1 is to be mounted. With a fastening element, which would be described further below, the claw member 11.1 can also be mounted on support the flange thickness of which is smaller than the distance d. At the end of the bearing section 32 remote from the claw section 31, transverse to the bearing section 32, the flange section 21 with the elongate opening 22 and locking means 24 is provided.

FIG. 5 shows a holding-down member of the holding device according to the first embodiment of the present invention. The holding-down member 12.1 of the holding device 1 has a substantially rectangular connection section 41 and holding-down section 42 extending downwardly in the direction toward the upper surface of the support. Approximately in the center of the connection section 41, a through-bore 43 is formed. In the region of the contact surface, e.g., with the flange section 21 of the claw member 11.1, complementary locking means 44 is provided. The locking means 44 engages the locking means 24 provided on the flange section 21 of the claw member 11.1.

Figure 6:
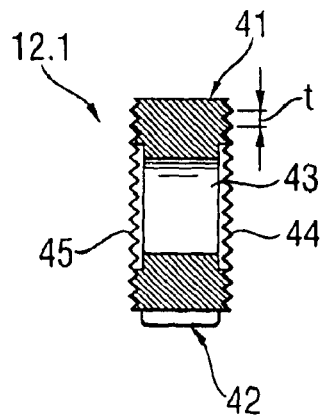
FIG. 6 a cross-sectional view of the holding-down member along line VI—VI in FIG. 5.

The cross-sectional view of the holding-down member 12.1 is shown in FIG. 6. The connection section 41 has, as it has already been discussed above, locking means 44 and 45 complementary to the locking means 24 of the flange section 21 of the claw member 11.1 and provided on the opposite sides of the connection section 41. With the complementary locking means 44, 45, provided on the opposite sides of the connection section 41, the holding down member 12.1 is suitable for both lefthand-side mounting and righthand-side mounting on a claw member, e.g., claw member 11.1. The second side of the connection section 41, which is provided with locking means, can be engaged by an engaging part of the fastening element and which is provided with a corresponding toothing.

Figure 7:
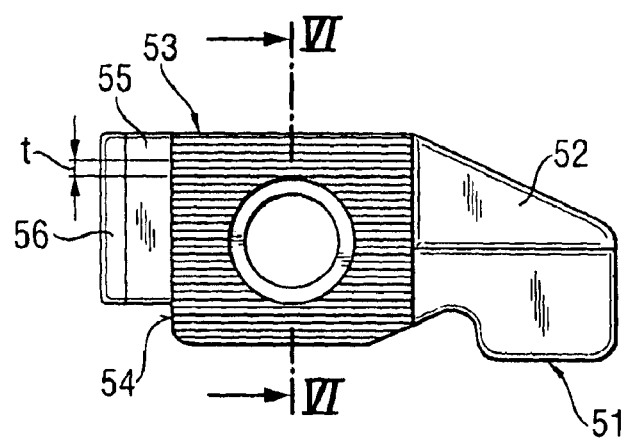
FIG. 7 a side view of a holding-down member of a holding device according to a second embodiment of the present invention.

FIG. 7 shows another embodiment of a holding-down member. The holding-down member 51, which is shown in FIG. 7, is formed similar to the holding member 12.1. However, the holding-down member 51 has, in addition, at a side 54 of the connection section 53, remote from the holding-down section 51, a T-shaped projection 55. The flange 56 of the T-shaped projection 55 lies, preferably, on an outer side of the flange section of a claw member on which the holding-down member 51 is mounted. During positioning of the holding-down member 51 on a claw member, the T-shaped projection 55 provides for guiding of the holding-down member 51 therealong. The cross-section of the connection section 53 corresponds to that of the connection section 41 of the holding-down member 12.1 shown in FIG. 6.

Figure 8:
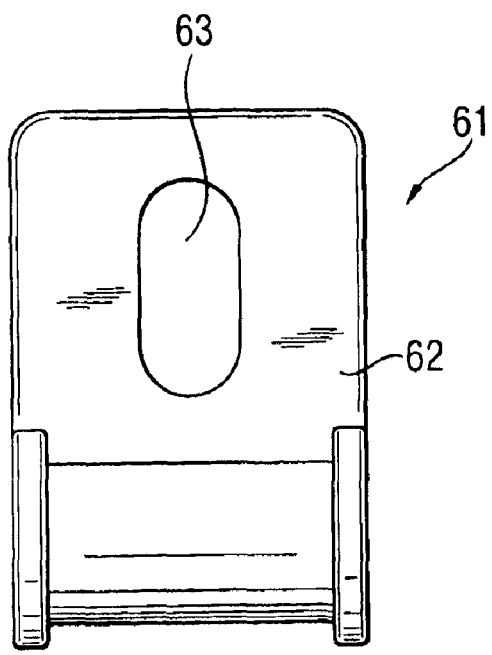
FIG. 8 a front view of a claw member of the holding device according to a third embodiment of the present invention.

A claw member of a holding device according to a third embodiment of the present invention is shown in FIG. 8. The claw member 61, which is shown in FIG. 8 has substantially the same shape as the claw member 11.1 shown in FIGS. 3–4. The claw member 61 differs from the claw member 11.1 in that no locking means is provided on the flange section 62 in the region of an elongate opening 63.

Figure 9:
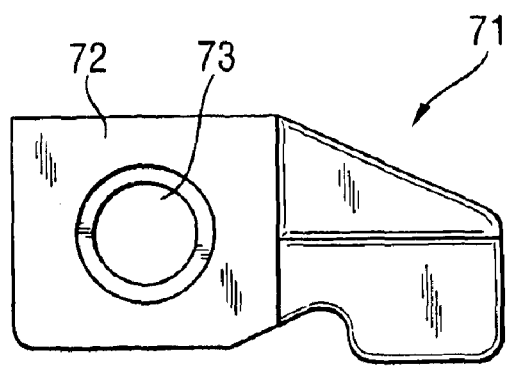
FIG. 9 a side view of a holding-down member of the holding device according to the third embodiment of the present invention.

FIG. 9 shows a side view of a holding-down member of the holding device according to the third embodiment of the present invention. The holding-down member 71, which is shown in FIG. 9, is substantially similar to the holding-down member 12.1 shown in FIGS. 5–6. The holding-down member 71 differs from the holding-down member 12.1 in that no locking means is provided on the connection section 72 in the region around the bore 73. In this embodiment, there is no locking means on opposite sides of the axis of the bore 73. The force-locking connection is provided by tightening of the fastening element.

Figure 10:
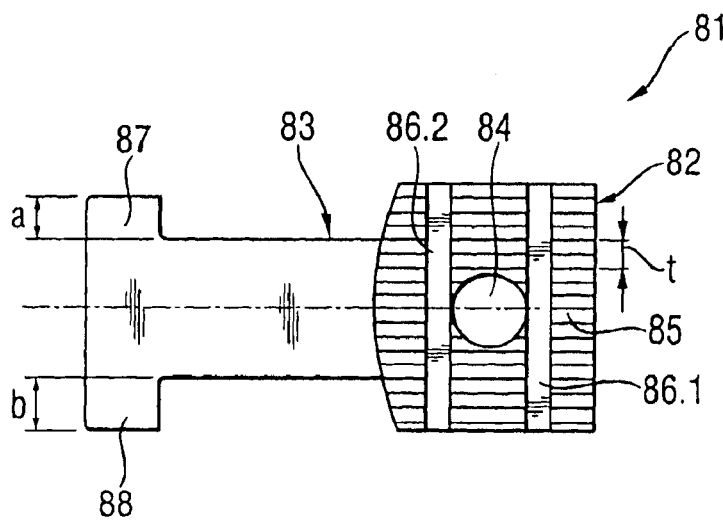
FIG. 10 a side view of another embodiment of a holding-down member.

FIG. 10 shows another embodiment of a holding-down member. The holding-down member 81, which is shown in FIG. 10, has, as the previously described holding-down members, a connection section 82 and a holding-down section 83. The connection section 82 has a through-bore 84 through which a fastening element extends. Preferably, on both sides of the connection section 82 of the axis of the bore 84, locking, e.g., complementary locking means 85, which cooperates with the locking means of a claw member or an engaging part of a fastening element, is provided. The locking means 85 provides, in a tightening condition of the fastening element, for formlocking connection of separate elements of the holding device. In addition, the connection section 82, has on its opposite sides guide grooves 86.1, 86.2 in which guide webs of a claw member, which are formed corresponding to the groove cross-section, engage. The guide grooves provide for alignment of the holding-down member 81 during its height-adjustment.

The holding-down section 83 has, in the embodiment shown in FIG. 10, a substantially T-shaped profile opposite legs 87 and 88 of which project beyond the holding-down section 83 by different distances, with the projection a of the leg 87 amounting to a half of the projection b of the leg 88. The difference between the projections a and b corresponds preferably to a half of the tooth pitch t, e.g., to a half of a grid spacing of the toothing of the locking means 85. Dependent on the arrangement (i.e., which of the legs 87, 88 is located adjacent to the bearing plate), the grid size of the locking means 85 can be halved.

Figure 11:
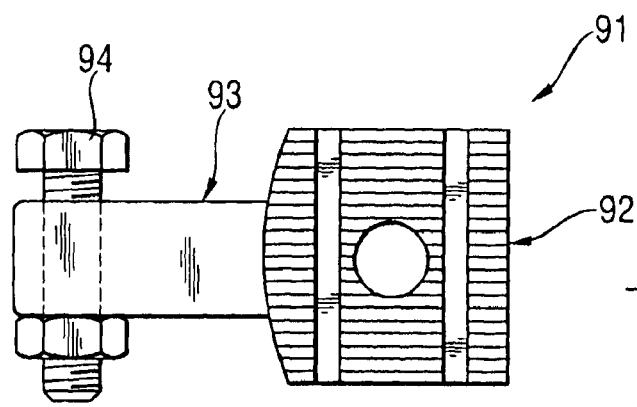
FIG. 11 a side view of a further embodiment of a holding-down member.

Another embodiment of a holding-down member is shown in FIG. 11. The holding-down member 91, which is shown in FIG. 11, has a connection section 92, which correspond to the connection section 82 of the holding-down member 81 shown in FIG. 10, and a holding-down section 93. The holding-down section 93 has a through-opening that extends perpendicular to the longitudinal extent of the holding-down section 93. The through-opening can be provided with an inner thread with which an adjusting bolt 94 cooperates. After the positioning of the holding-down member 91 on a claw member, a desired position of the holding-down member 91 for holding a to-be-secured bearing plate can be adjusted with the adjusting bolt 94.

Figure 12:
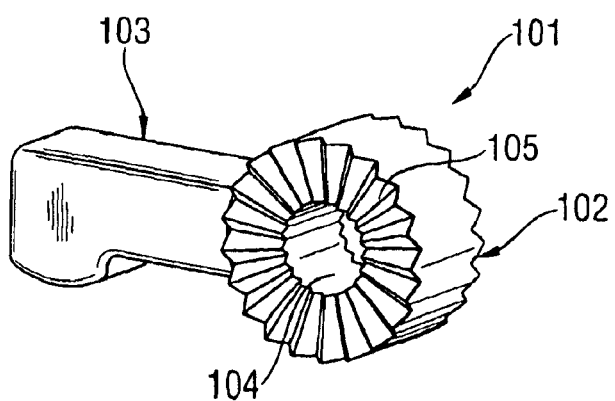
FIG. 12 a perspective view of a still further embodiment of a holding-down member.

FIG. 12 shows a perspective view of the holding-down member according to another embodiment. The holding-down member 101, which is shown in FIG. 12, has a connection section 102 and a holding-down section 103. In the connection section 102, a bore 104 for a fastening element is formed. On opposite sides of the connection section 102, with respect to the axis of the bore 104, locking or complementary locking means 105 is provided. The locking means 105 extends from an edge of the bore 104 outwardly in form of rays. The claw member for the holding-down member 101 has, in contrast to the previously described claw members, instead of an elongate opening, a bore through which a fastening element can extend. On the claw member or on the rear engaging part of the fastening element, the locking or complementary locking means likewise extend from a center in form of rays outwardingly so that it can be brought into engagement with the locking or complementary locking means 105 on the connection section 102 of the holding-down member 101. By rotating the holding-down member 101 about the axis of the fastening element, a desired height of the holding-down section 103 for holding down the bearing plate is obtained.

Figure 13:
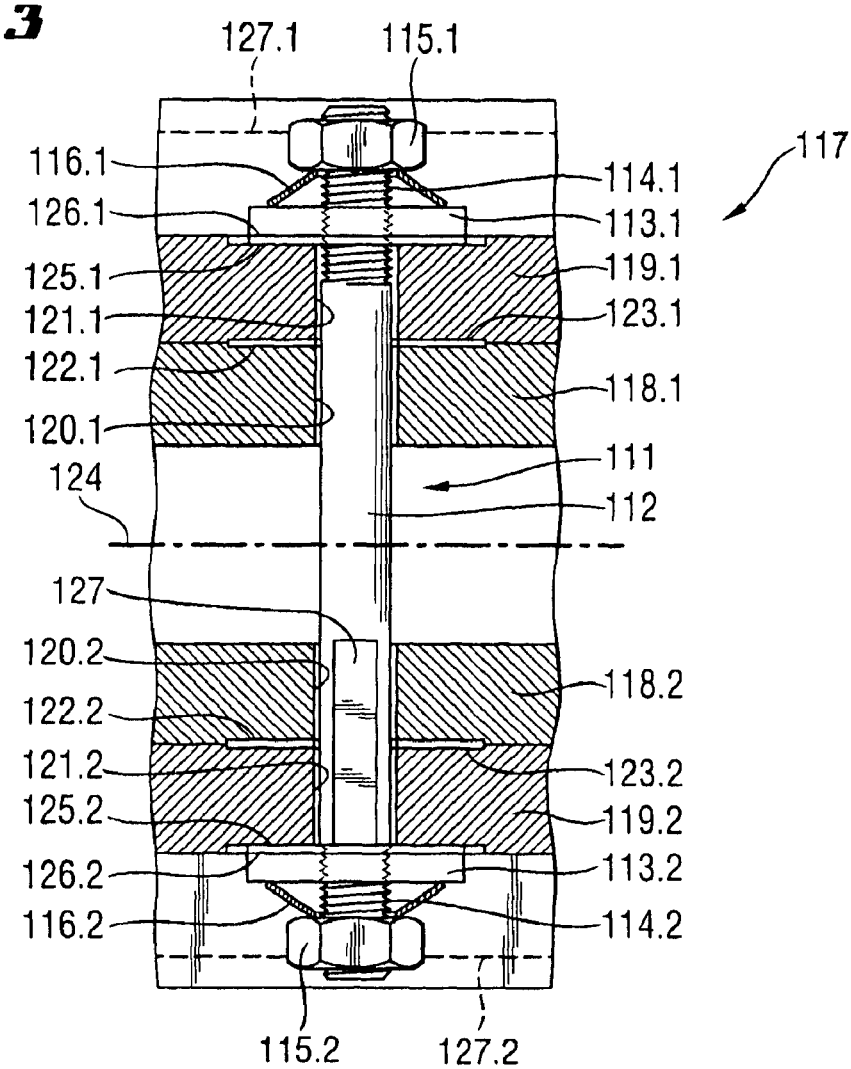
FIG. 13 a side view of a fastening element.

FIG. 13 shows a fastening element for securing the claw and holding-down members. The fastening element 111, which is shown in FIG. 13, has a threaded rod 112 at opposite ends of which engaging part 113.1 and 113.2 are provided. The opposite ends of the threaded rod 112 have respective threaded sections 114.1, 114.2. Respective nuts 115.1, 115.2 are screwed on the respective threaded sections 114.1, 114.2. The fastening element 111 is tightened by tightening one or both of nuts 115.1 and 115.2. A leaf spring 116.1, 116.2 is provided between a nut 115.1, 115.2 and a respective threaded section 114.1, 114.2. The threaded rod 112 has a guide section 127 having planar surfaces. The guide section 127 prevents rotation of the fastening element 111 in a bore 121.1 and in an elongate opening 120.2 during tightening of the fastening element 11. The guide section 127 makes the use of any holding means for holding the fastening element 111 during tightening unnecessary.

A holding device 117, in which the fastening element 111 is used, has two claw members the flange sections 118.1 and 118.2 of which are shown in FIG. 13, and two holding-down members 119.1 and 119.2. The fastening element 111 extends through elongate openings 120.1, 120.2 of the flange section 118.1, 118.2, respectively, and bores 121.1, 121.2 of the holding-down members 119.1, 119.2, respectively, connecting different members of the holding device 117. The flange sections 118.1, 118.2 have, respectively, locking means 122.1, 122.2 in form of toothing and which cooperate with respective complementary locking means 123.1, 123.2 of the holding-down members 119.1, 119.2, respectively. On their sides opposite to the sides provided with the complementary locking means 123.1, 123.2, respectively, the holding-down members 119.1, 119.2 are provided with locking means 125.1, 125.2, respectively, which has a geometry similar to that of the complementary locking means 123.1, 123.2. The locking means 125.1, 125.2 cooperates, respectively, with locking means 126.1, 126.2 provided on the opposite engaging parts 113.1, 113.2, respectively. The interengagement of the corresponding locking means provides for a formlocking connection of separate parts of the holding device in the assembled condition of the holding device.

In order to be mounted on a support, the holding device 117 is pulled outwardly against biasing forces of the springs 116.1, 116.2, so that the free ends of the claw sections of the claw members can engage the flange edges 127.1, 127.2 of the support. Upon release of the holding device 117, the claw sections of the claw members snap around the flange edges 127.1, 127.2 of the support. The holding device 117 can be positioned along the support in the direction of the support axis 124. When the excursion of the springs is sufficiently large, one of the springs, e.g., the spring 116.2, can be eliminated. By displacing the threaded rod in opposite directions, a formlocking connection between the flange sections 118.1, 118.2 and the holding-down members 119.1, 119.2, respectively, can be released, so that the holding-down members 119.1, 119.2 can be height-adjusted with respect to the support, perpendicular thereto. When the respective parts occupy their desired position, the fastening element 111 is tightened, with all of the parts of the holding device 117 being form and force-lockingly secured.

Figure 14:
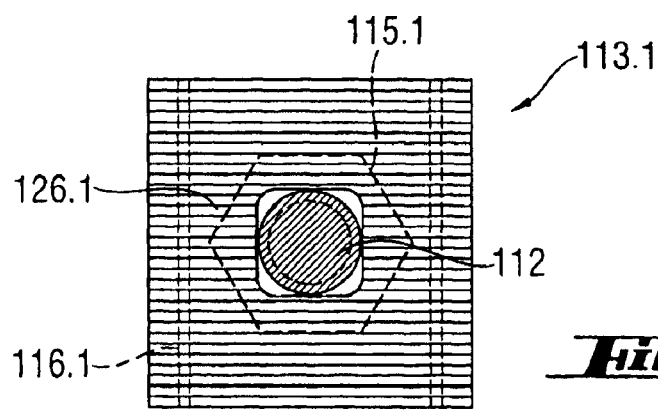
FIG. 14 a plan view of the engaging part of the fastening element.

The engagement part 113.1, which is shown in FIG. 14, has a rectangular shape and is secured on the threaded rod 112. The engagement part 113.1 is provided on its contact surface, which abuts the holding-down member 119.1, with complementary locking means 126.1 that cooperates with the locking means 125.1 of the holding-down member 119.1.

According to the invention, there is provided a holding device for securing show elements of a pipeline section on a support and which can be used for a number of different constructions of bearing plates of the shoe elements. Differently shaped holding-down members can be mounted on one and the same claw member. The holding device according to the present invention can be simply produced and mounted on a support.

Though the present invention was shown and described with references to the preferred embodiment, such are merely illustrative of the present invention and are not to be construed as a limitation thereof and various modifications of the present invention will be apparent to those skilled in the art. It is therefor not intended that the present invention be limited to the disclosed embodiment or details thereof, and the present invention includes all variations and/or alternative embodiments within the spirit and scope of the present invention as defined by the appended claims.

What is claimed is:

1. A holding device for securing a shoe element of a pipeline section and having a bearing plate on a support, the holding device (1, 2; 117) comprising at least two claw members (11.1., 11.2, 61) each having a claw section (31) for engaging around a support edge (127.1, 127.2), a bearing section (32) adjoining the claw section (31) for supporting the claw member (11.1, 11.2; 61) on an outer side of the support (3), and a flange section (21; 62; 118.1, 118.2) extending substantially perpendicular to the bearing section (32) and having an opening for securing the claw member (11.1, 11.2; 61) on the support (3) with a fastening element (13; 111); and a plurality of holding-down members (12.1, 12.2; 51; 71; 81; 91; 101; 119.1, 119.2) for holding down the bearing plate (5) on the outer side of the support (3), at least one of the holding-down members (12.1, 12.2; 51; 71; 81; 91; 101; 119.1, 119.2) being secured on each of the at least two claw members (11.1, 11.2; 61), the at least one holding-down member (12.1, 12.2; 51; 71; 81; 91; 101; 119.1, 119.2) being formed as a separate part fixedly securable on the flange section (21; 62; 118.1, 118.2) of the claw member (11.1, 11.2; 61) with fastening means, wherein the at least one of the holding-down members (51; 81; 91) has guide means (55; 86.1; 86.2) for guiding the at least one of the holding members (51; 81; 91) on the flange section of the claw member.

2. A holding device for securing a shoe element of a pipeline section and having a bearing plate on a support, the holding device (1, 2; 117) comprising at least two claw members (11.1., 11.2, 61) each having a claw section (31) for engaging around a support edge (127.1, 127.2), a bearing section (32) adjoining the claw section (31) for supporting the claw member (11.1, 11.2; 61) on an outer side of the support (3), and a flange section (21; 62; 118.1, 118.2) extending substantially perpendicular to the bearing section (32) and having an opening for securing the claw member (11.1, 11.2; 61) on the support (3) with a fastening element (13; 111); and a plurality of holding-down members (12.1, 12.2; 51; 71; 81; 91; 101; 119.1, 119.2) for holding down the bearing plate (5) on the outer side of the support (3), at least one of the holding-down members (12.1, 12.2; 51; 71; 81; 91; 101; 119.1, 119.2) being secured on each of the at least two claw members (11.1, 11.2; 61), the at least one holding-down member (12.1, 12.2; 51; 71; 81; 91; 101; 119.1, 119.2) being formed as a separate part fixedly securable on the flange section (21; 62; 118.1, 118.2) of the claw member (11.1, 11.2; 61) with fastening means, wherein the flange section (21; 118.1, 118.2) of the claw member (11.1, 11.2), is provided with locking means (24; 122.1, 122.2) which cooperates with complementary locking means (44; 53; 123.1; 123.2) provided on the at least one of the holding-down members (12.1, 12.2; 51; 71; 81; 91; 101; 119.1, 119.2) in an assembled condition of the holding device (1, 2; 117).

3. A holding device according to claim 2, wherein at least one of the locking means (24; 122.1, 122.2) and the complementary locking means (44; 53; 123.1, 123.2) comprises toothing.

4. A holding device according to the claim 3, wherein the toothing has a tooth pitch of 2 mm.

5. A holding device for securing a shoe element of a pipeline section and having a bearing plate on a support, the holding device (1, 2; 117) comprising at least two claw members (11.1., 11.2, 61) each having a claw section (31) for engaging around a support edge (127.1, 127.2), a bearing section (32) adjoining the claw section (31) for supporting the claw member (11.1, 11.2; 61) on an outer side of the support (3), and a flange section (21; 62; 118.1, 118.2) extending substantially perpendicular to the bearing section (32) and having an opening for securing the claw member (11.1, 11.2; 61) on the support (3) with a fastening element (13; 111); and a plurality of holding-down members (12.1, 12.2; 51; 71; 81; 91; 101; 119.1, 119.2) for holding down the bearing plate (5) on the outer side of the support (3), at least one of the holding-down members (12.1, 12.2; 51; 71; 81; 91; 101; 119.1, 119.2) being secured on each of the at least two claw members (11.1, 11.2; 61), the at least one holding-down member (12.1, 12.2; 51; 71; 81; 91; 101; 119.1, 119.2) being formed as a separate part fixedly securable on the flange section (21; 62; 118.1, 118.2) of the claw member (11.1, 11.2; 61) with fastening means, wherein one of the flange section (21; 62; 118.1, 118.2) and the at least one of the holding-down members (12.1, 12.2; 51; 71; 81; 91; 101; 119.1, 119.2) has at least one elongate opening (22; 63; 120.1, 120.2) extending transverse to the bearing section (32) of the claw member (11.1, 11.2; 61), and wherein a region, which surrounds the at least one elongate opening (22; 120.1, 120.2), has locking means (24; 122.1; 122.2) formed of a plurality of teeth extending parallel to each other and transverse to the at least one elongate opening (22; 120.1, 120.2).

6. A holding device for securing a shoe element of a pipeline section and having a bearing plate on a support, the holding device (1, 2; 117) comprising at least two claw members (11.1., 11.2, 61) each having a claw section (31) for engaging around a support edge (127.1, 127.2), a bearing section (32) adjoining the claw section (31) for supporting the claw member (11.1, 11.2; 61) on an outer side of the support (3), and a flange section (21; 62; 118.1, 118.2) extending substantially perpendicular to the bearing section (32) and having an opening for securing the claw member (11.1, 11.2; 61) on the support (3) with a fastening element (13; 111); and a plurality of holding-down members (12.1, 12.2; 51; 71; 81; 91; 101; 119.1, 119.2) for holding down the bearing plate (5) on the outer side of the support (3), at least one of the holding-down members (12.1, 12.2; 51; 71; 81; 91; 101; 119.1, 119.2) being secured on each of the at least two claw members (11.1, 11.2; 61), the at least one holding-down member (12.1, 12.2; 51; 71; 81; 91; 101; 119.1, 119.2) being formed as a separate part fixedly securable on the flange section (21; 62; 118.1, 118.2) of the claw member (11.1, 11.2; 61) with fastening means, wherein the fastening element (111) comprises spring means (116.1, 116.2) acting on the fastening element for preloading connectable parts of the holding device (117).

7. A holding device according to claim 6, wherein the at least one of the holding-down members (12.1, 12.2; 51; 81; 91; 101; 119.1, 119.2) has additional locking means (45; 125.1, 125.2) provided on a side thereof opposite a side on which the complementary locking means (44; 53; 123.1, 123.2) is provided.

8. A holding device according to claim 7, wherein the fastening element (111) has threaded means (112), and at least one engaging part (113.1, 113.2) provided with complementary locking means (126.1, 126.2) which cooperates with the additional locking means (125.1, 125.2) of the at least one holding-down members (119.1, 119.2).

9. A holding device for securing a shoe element of a pipeline section and having a bearing plate on a support, the holding device (1, 2; 117) comprising at least two claw members (11.1., 11.2, 61) each having a claw section (31) for engaging around a support edge (127.1, 127.2), a bearing section (32) adjoining the claw section (31) for supporting the claw member (11.1, 11.2; 61) on an outer side of the support (3), and a flange section (21; 62; 118.1, 118.2) extending substantially perpendicular to the bearing section (32) and having an opening for securing the claw member (11.1, 11.2; 61) on the support (3) with a fastening element (13; 111); and a plurality of holding-down members (12.1, 12.2; 51; 71; 81; 91; 101; 119.1, 119.2) for holding down the bearing plate (5) on the outer side of the support (3), at least one of the holding-down members (12.1, 12.2; 51; 71; 81; 91; 101; 119.1, 119.2) being secured on each of the at least two claw members (11.1, 11.2; 61), the at least one holding-down member (12.1, 12.2; 51; 71; 81; 91; 101; 119.1, 119.2) being formed as a separate part fixedly securable on the flange section (21; 62; 118.1, 118.2) of the claw member (11.1, 11.2; 61) with fastening means, wherein the holding-down members (12.1, 12.2; 51; 71; 81; 91; 101; 119.1, 119.2) have a height-adjustable, with respect to the outer side of the support (3), holding-down section (42; 52; 83; 93; 103).

10. A holding device according to claim 9, wherein the at least one of the holding-down members (12.1, 12.2; 51; 71; 81; 91; 101; 119.1, 119.2) has an opening (43; 73; 84; 104; 121; 121.2) through which the fastening means which secures the at least one of the holding-down members on the flange section of the claw member, extends.

11. A holding device according to claim 10, wherein the fastening element (13; 111) forms part of the fastening means with which the claw members are secured on the support, and wherein the fastening element (13; 111) is formed as a threaded element.

* * * * *